Figure 1:
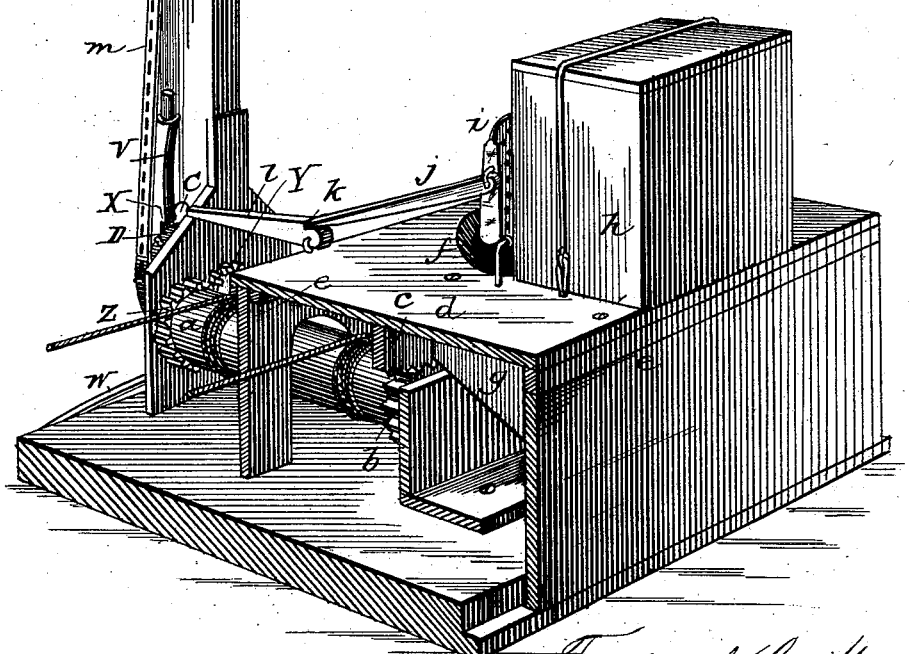

(No Model.)  3 Sheets—Sheet 1.

F. C. MORROW.
DEVICE FOR HIVING BEES

No. 293,905. Patented Feb. 19, 1884.

WITNESSES:

Frederick C. Morrow
INVENTOR.

By Louis Bagger & Co.
ATTORNEYS.

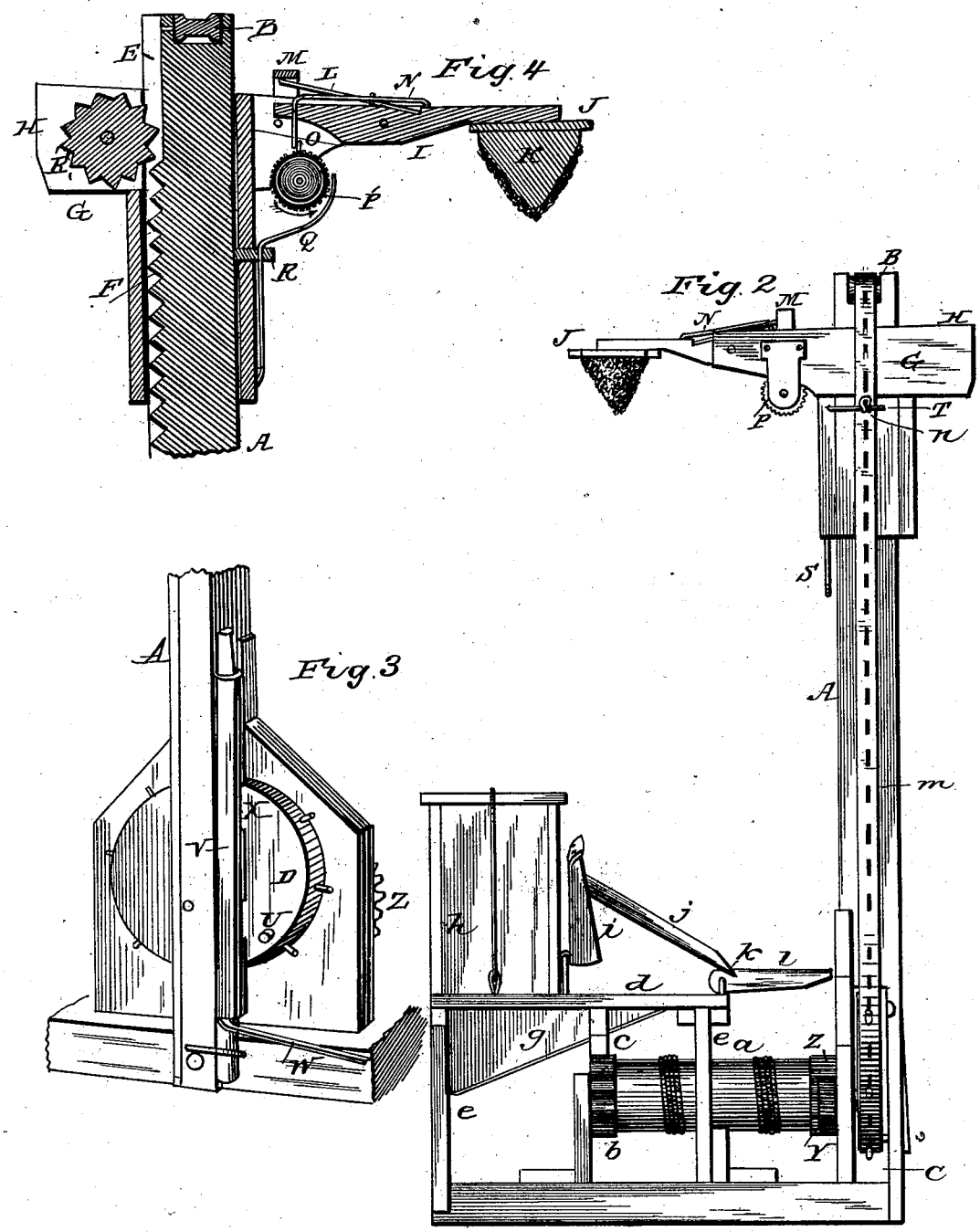

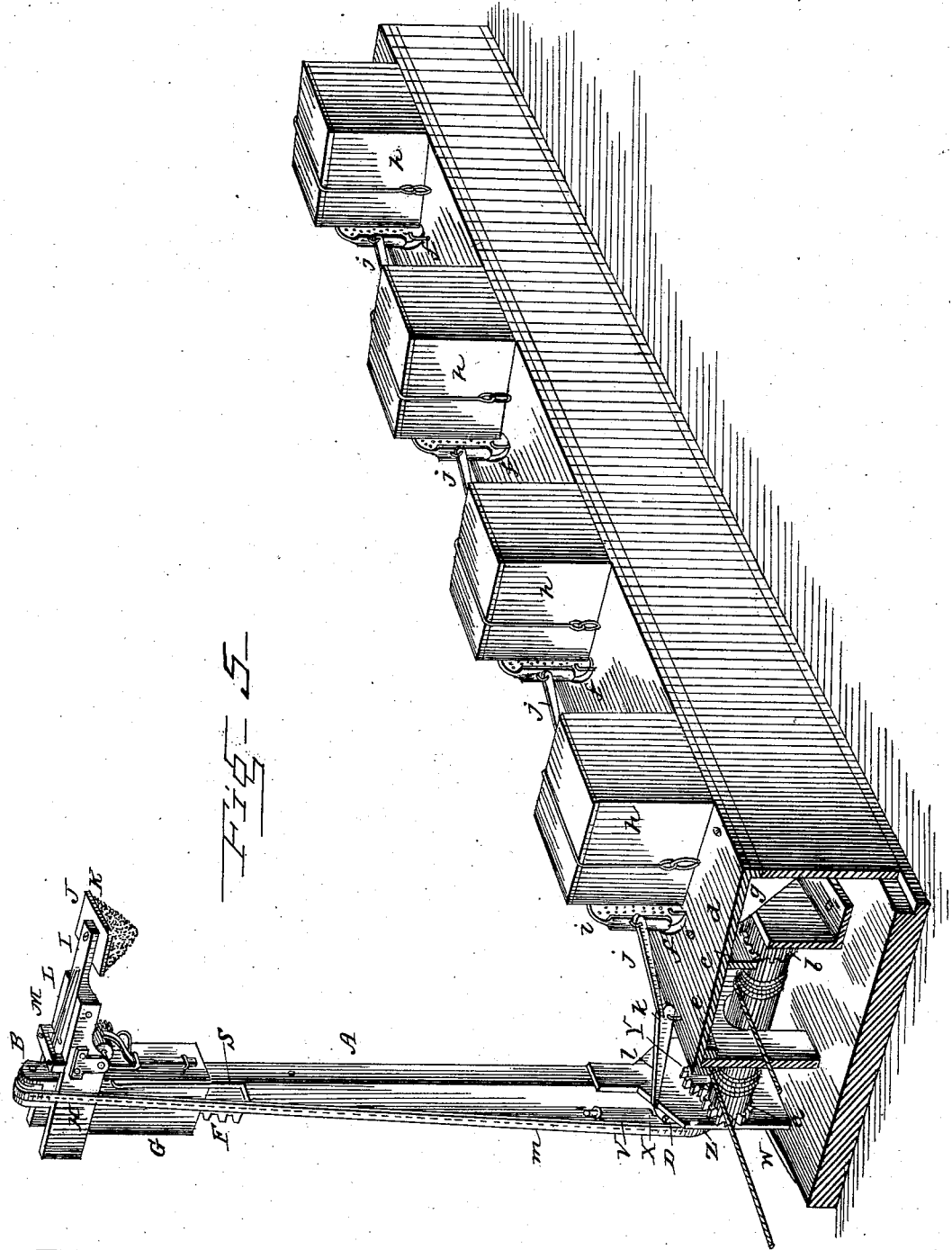

UNITED STATES PATENT OFFICE.

FREDERICK CARPENTER MORROW, OF WALLACEBURG, ARKANSAS.

DEVICE FOR HIVING BEES.

SPECIFICATION forming part of Letters Patent No. 293,905, dated February 19, 1884.

Application filed August 11, 1883. (No model.)

*To all whom it may concern:*

Be it known that I, FREDERICK C. MORROW, a citizen of the United States, and a resident of Wallaceburg, in the county of Hempstead and State of Arkansas, have invented certain new and useful Improvements in Devices for Hiving Bees; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved device for hiving bees. Fig. 2 is a side view of the same. Fig. 3 is a detail view of the lower portion of the standard; and Fig. 4 is a vertical section, on an enlarged scale, of the sliding frame and the upper end of the standard; and Fig. 5 is a perspective view, on a smaller scale, of the entire device, showing the train or successive row of hives.

Similar letters of reference indicate corresponding parts in all the figures.

My invention has relation to devices for hiving bees; and it consists in the improved construction, combination, and arrangement of parts of the same, as hereinafter more fully described and claimed.

It is a well-known fact that when the bees swarm they will light in a bunch or "settle" upon the nearest object to the hive which may happen to attract their attention, when they will send spies out in search of a hollow tree or other suitable place for hiving, and that it is desirable for the owner or cultivator of bees to capture and hive the swarm before the spies are sent out, or before they return; and to insure greater certainty in the hiving of the swarms, and to avoid the necessity of a continual watch over the bees during the time when they swarm, I construct a frame sliding upon an upright standard, and having a trigger, which releases it and allows it to slide down upon the standard when the bees alight upon a dark-colored block upon the outer end of the trigger, which is intended to imitate a swarm or "settle" of bees, and the frame descending with the swarm will drop them into a chute, which is covered with a lid, tripped when the frame reaches the lower end of the standard, thus trapping the bees, which will pass from the chute into a hive placed upon the automatically moving table in which the chute is formed, while another chute and hive is brought forward with the table, and the frame raised to receive and drop another swarm, the construction of which device I will now proceed to describe more explicitly.

In the accompanying two sheets of drawings, the letter A indicates the standard, which is preferably placed under the limbs of a tree, as the bees have a tendency to swarm toward and settle upon trees, especially linden trees or other shade-trees, and the upper end of which standard forms bearings for a pulley, B, while its lower end has a longitudinal slot, C, in which a sprocket-wheel, D, is journaled. One edge of the standard forms a rabbet, E, extending from the top of the same to near the lower end, and a cogged rack, F, is formed in the bottom of the rabbet, near the upper end of the same. A rectangular casing, G, slides and fits upon the standard, and the upper ends of the side pieces of the casing are provided with two longer cross-pieces, H, between the ends of which a lever, I, is pivoted, upon the outer end of which lever a board, J, is fastened, to the under side of which board a block, K, of wood or other material, is fastened, the color and shape of which block is made to imitate the appearance of a "settle" of bees. A flat spring, L, is fastened upon the upper side of the lever, pointing with its free slightly-upward-bent end toward the inner end of the lever, and bearing with that end against a cross-piece, M, fastened to the upper edges of the cross-pieces upon the upper end of the sliding casing, and the downwardly-bent doubled end of a doubled rod, N, fastened upon the upper surface of the lever, projects through a perforation in the inner portion of the lever, forming a catch, which is engaged by a bail, O, projecting from the side of a cylinder, P, having a suitable connection with a motor—as, for instance, a spring coiled inside the cylinder—which will rotate the latter when the catch upon the lever is released. A flat spring, Q, is fastened with its lower end upon the side of the sliding casing, and bears with its upper free end against the surface of the cylinder, and is forced outward by the bail upon the same when it is rotated, and the outer end of a block or bolt, R, bearing with its inner end against the side of the standard, is fastened to the spring sliding in a perforation in the casing, and holds the casing from sliding down upon the standard when held in against the side of the same, but will allow the casing to slide down when the spring, and the bolt with it, is forced out by the bail. In the other side of the casing is journaled a pinion, R', which engages the rack upon the standard, and serves to retard the casing when it starts sliding, allowing the bees to collect upon the block after their weight has pulled the lever and started the casing, and a bent rod, S, is fastened with its vertical portion upon the side of the casing, the lower bent end of the same extending laterally some distance below the lower edge of the casing, while a rod, T, bent at a right angle, is fastened at the upper end of the casing, with one end projecting into the side of the same and the free bent end extending horizontally. The sprocket-wheel D has a projection, U, upon its outer face, which bears against the edge of a sliding bar, V, the lower end of which bears against a spring, W, which forces the bar up, and which bar slides in bearings upon the lower end of the standard, and the sliding bar has a notch, X, above the place where the projecting lug bears against it, which will admit of the lug passing in the notch when the bar is depressed, which it will be when the lower end of the sliding casing strikes its upper end in descending. The inner end of the shaft of the sprocket-wheel is provided with a pinion, Y, which meshes with a pinion, Z, upon the outer end of a drum, a, which is connected with a suitable motive power, and has another pinion, b, upon its inner end. This pinion engages a rack-bar, c, upon the under side of a sliding table, d, which slides upon ways, e, formed by boards or planks placed upon their edges, and the table has a series of apertures, f, which are of sufficient size to admit of a swarm of bees being dropped through them, and are provided with an inclined chute, g, which communicates at its inner end with the lower end of a hive, h, so that when the bees are dropped into the chute they will enter the hive. The outer open end of the aperture of the chute is provided with a hinged perforated lid, i, to the outer end of one side of which a rod or bar, j, is hinged, the outer end of which bar is sharpened to a flat point, which may fit into a notch, k, upon the upper surface of the inner end of a bar or trigger, l, which is hinged with its inner end upon the edge of the table, within reach of the laterally-bent rod upon the lower end of the sliding casing, so that the hinged lid may be propped up by the sharpened bar, the latter having its point resting in the notch of the trigger, which will be tripped by the descending casing dropping the lid. At the same time the casing descends, tripping the lid, the sliding bar will be pushed down, allowing the sprocket-wheel to turn the motive power, acting upon the drum, being always ready to turn the same, and a perforated belt or sprocket-chain, m, passing over the sprocket-wheel and the pulley at the upper end of the standard, and having a hooked catch, n, will commence traveling, the catch engaging the bent bar or rod upon the side of the casing, lifting it to the top of the standard, where it slips the rod and passes downward, placing it in position for engaging the rod again, and the pinion upon the inner end of the drum will draw the table to the side, placing another chute and hive in position for receiving another swarm, the entire device acting automatically with the exception of the setting of the triggers for the lid.

Where a motive power which is continually ready for action is not obtainable, the sprocket-wheel, the drum and rack-bar, and the other parts at the lower end of the standard may be dispensed with, and a cord or rope attached to the casing, passing over the pulley at the top of the standard, and operated by hand, as well as the sliding table, when it is desirable to have an alarm attached to the mechanism, releasing the casing at the top of the standard, which will notify the bee-cultivator that the swarm has been trapped, calling him to set the casing and the hive in position for catching another swarm.

To attract the bees to the block upon the lever of the casing, it may be covered with honey or other sweet substance, which will attract the first bees of the swarm, when the remainder of the swarm will follow them blindly.

Having thus described my invention, I claim and desire to secure by Letters Patent of the United States—

1. In a device for hiving bees, the combination of a trigger having a head or block shaped and colored in imitation of a settled swarm of bees, a sliding case released by said trigger, and chutes having connection with hives adapted to receive the swarm dropped from the block, and having lids adapted to close the chutes, as and for the purpose shown and set forth.

2. In a device for hiving bees, the combination of an upright standard, a frame or casing sliding upon the standard, a lever or trigger releasing the said frame, and having a block upon its outer end shaped and colored in imitation of a bee settle, a sliding table or board having chutes for receiving the bees when dropped from the block, means for closing the chutes when the bees are in the same, and hives communicating with the chutes, and means for sliding the table and raising the sliding frame or casing after it has descended, as and for the purpose shown and set forth.

3. The combination of a standard having a rabbeted edge, forming a cogged rack near its upper end, a frame or casing fitting and sliding upon the standard, having laterally-projecting cross-pieces upon its upper end, a spring-operated revolving cylinder provided with a bail upon its surface, a lever pivoted between the cross-pieces, and having a block upon its outer end shaped and colored to imitate a bee settle, a spring upon its upper surface forcing the inner end down, and a catch upon its under side engaging the bail upon the cylinder, a spring fastened upon the side of the frame, and a block or bolt sliding in a perforation upon the side of the frame, bearing with its inner end against the side of the standard, and fastened at its outer end to the said spring, and means for raising the frame, as and for the purpose shown and set forth.

4. The combination of a standard, a frame sliding upon the said standard, having a trigger provided with a block for receiving the settling swarm of bees, releasing the frame by the weight of the bees, and having a downwardly-projecting bent rod upon its lower end, a chute having connection with a hive, a hinged lid covering the opening of the chute, a flat pointed arm hinged to the side of the lid, and a trigger or arm hinged to the base of the hive and scoop, projecting out to be struck by the rod upon the sliding frame when it descends, and having a notch upon the inner end of its upper surface for the reception of the flat point of the hinged arm, as and for the purpose shown and set forth.

5. The combination of a standard, a frame sliding upon the standard, and having a trigger, releasing the frame by the weight of the bees settling upon a block upon its outer end, a drum having connection with a motor, and having pinions upon each end, a table sliding upon ways, having a series of hives and traps for receiving the bees, the said traps being operated by the descending sliding frame, and a rack-bar upon its under side meshing with the pinion upon the inner end of the drum, a wheel journaled in the lower end of the standard, having a pinion upon its shaft meshing with the pinion upon the outer end of the drum, and having a projecting lug upon its outer face, and a bar sliding upon the lower end of the standard, having a notch at its inner edge slightly above the point where the lug upon the wheel bears against it, and operated by the descending frame, as and for the purpose shown and set forth.

6. The combination of a standard, a frame sliding upon the standard, having a trigger, releasing the frame by the weight of the bees settling upon the outer end of the same, and having a horizontally-projecting bent arm upon one side, a drum having connection with a motor, and having a pinion upon its outer end, a sprocket-wheel journaled in the lower slotted end of the standard, having a pinion upon its shaft meshing with the pinion upon the drum, and having a lug projecting from its face, a bar sliding in bearings upon the lower end of the standard, having a notch slightly above the point where the lug upon the wheel bears against it, and operated by the descending frame, and a sprocket-chain or perforated belt passing over the sprocket-wheel and a pulley upon the upper end of the standard, and having a catch engaging the rod upon the sliding frame when ascending, as and for the purpose shown and set forth.

7. The bee-hiving device consisting of a standard having a pulley at its upper end and a slot at its lower end, a sliding frame or casing having a trigger provided with a block shaped and colored to imitate a bee settle upon its outer end, and a horizontally and a vertically projecting bent rod upon its sides, a sliding bar having a notch in its inner edge, a sprocket-wheel having a lug upon its outer face and a pinion upon its shaft, a drum having connection with a motor and having a pinion upon its inner and outer end, a sliding table having a rack-bar upon its under side, chute fastened in the table, hives fastened over one end of the chute, lids hinged over the open ends of the chute, flat-pointed arms or props hinged to the lids, and triggers having notches upon their upper surfaces and hinged upon the outer edge of the sliding table, all constructed, combined, and arranged as and for the purpose shown and set forth.

In testimony that I claim the foregoing as my own I have hereunto affixed my signature in presence of two witnesses.

FREDERICK CARPENTER MORROW.

Witnesses:
 EVERETT STUART,
 TRAVIS HOLT.